[centered header]

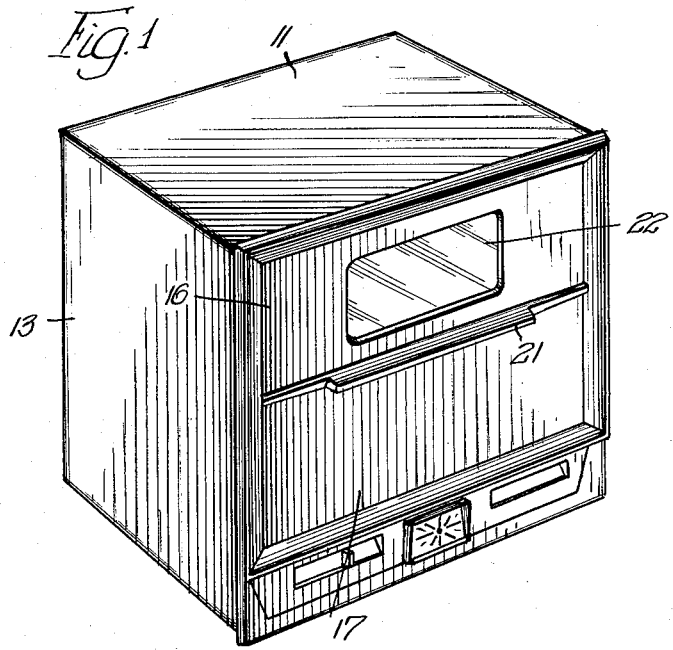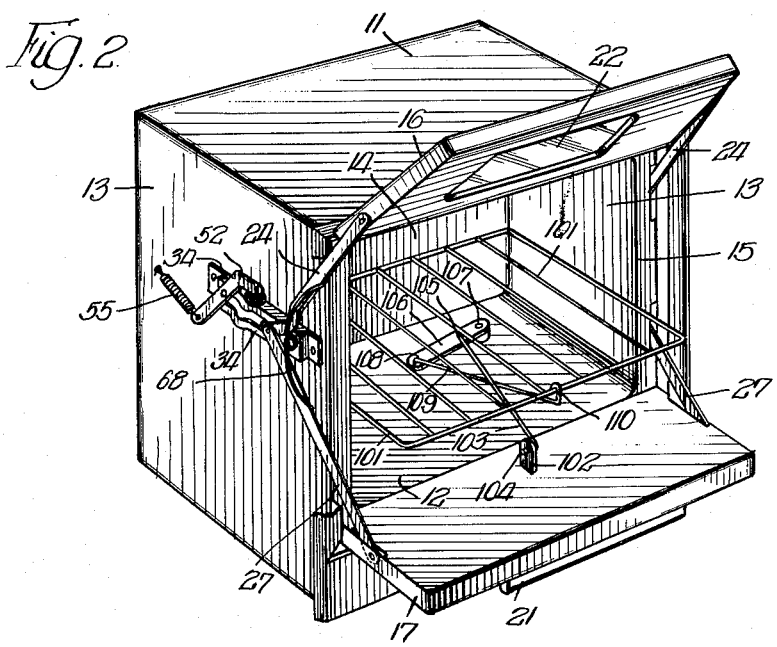

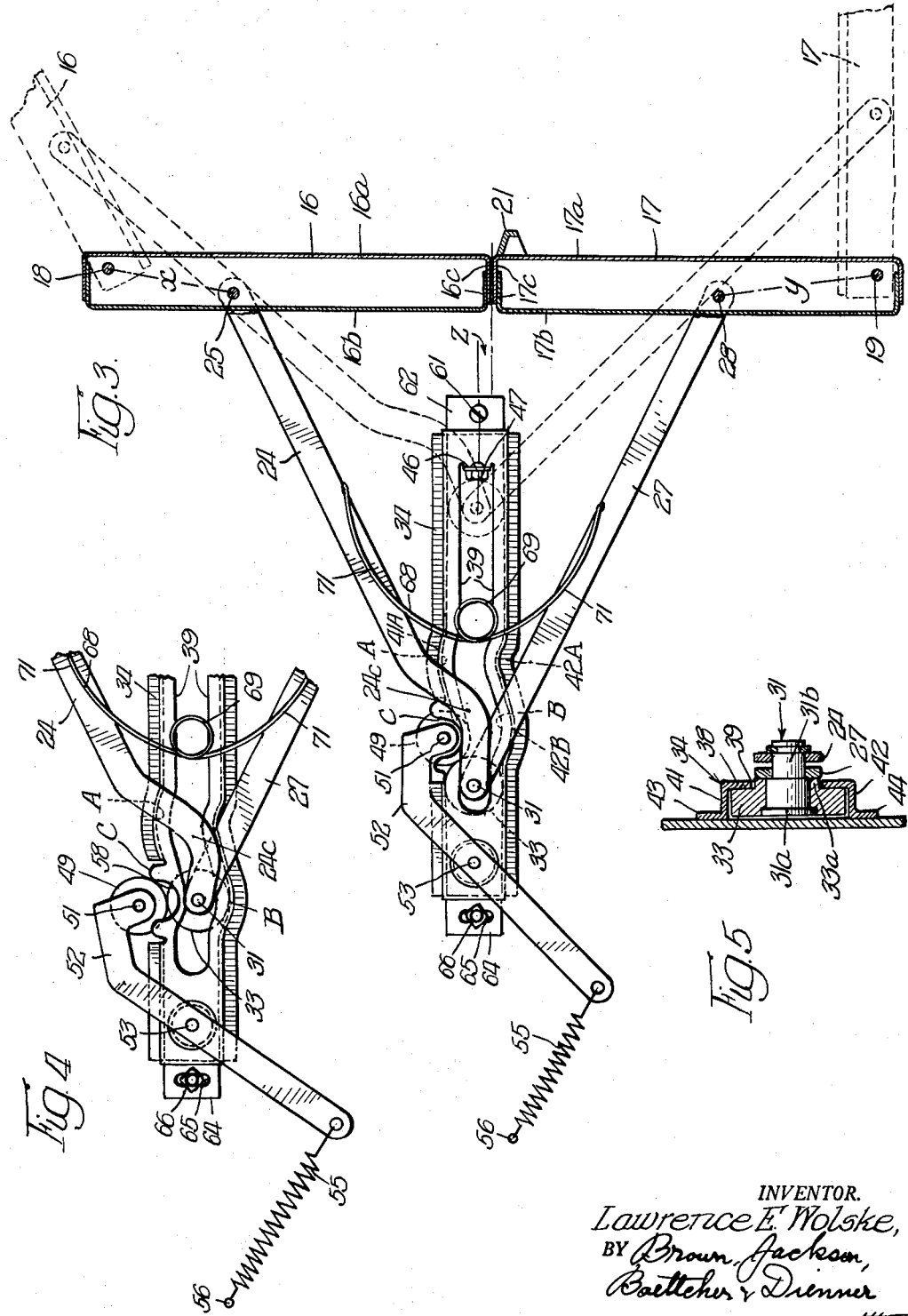

2,997,041
COOKING OVEN
Lawrence E. Wolske, Benton Harbor, Mich., assignor to Whirlpool Corporation, a corporation of Delaware
Filed Jan. 28, 1957, Ser. No. 636,777
9 Claims. (Cl. 126—191)

This invention relates to cooking ovens, and in its preferred embodiment is concerned more particularly with the self-contained built-in type of oven which is built directly into the wall or supporting surface of which it forms a part. However, the invention is not necessarily limited thereto, but numerous features of the invention are also applicable to cooking ovens which constitute a part of a portable gas range or electric range.

One of the objects of the invention is to provide the front opening of the oven with an improved arrangement of upper and lower closure doors which have horizontal hinge mounting adjacent the upper and lower edges of the opening for swinging upwardly and downwardly respectively into their open positions.

These upper and lower doors are connected together for simultaneous operation by a novel arrangement of door controlling linkage which imparts differential degrees of opening movement to the upper and lower doors. The lower door swings downwardly through substantially 90° to open position, where it occupies the position of an outwardly extending lower shelf at the front of the oven on which the housewife can place baking pans and other utensils when inserting or removing food from the oven. The upper door, on the other hand, opens through considerably more than 90°, this upper door swinging into a sharply inclined upward angle by virtue of the differential action of the door controlling linkage, where this upper door does not hinder the view of the housewife into the interior of the oven.

By employing two doors meeting edge to edge to close the oven opening, the lower door in its open position only extends out from the front of the oven one-half the distance that would be required of a single door, which is a substantial space saving advantage in small kitchenette apartments and the like.

Another object of the invention is to provide improved door controlling linkage having an improved detent and spring action which will retain the oven doors in any one of three different position, viz: (1) a fully closed position; (2) a wide open position; and (3) an intermediate partly open position, which may be desirable to allow free circulation of air in the oven in certain broiling operations.

Another object of the invention is to provide improved automatic rack sliding mechanism which will automatically slide one of the oven racks outwardly from the front of the oven where the housewife can inspect or remove the food, without her having to pull the hot oven rack outwardly in a manual operation.

Other objects, features and advantages of the invention will appear from the following detailed description of one preferred embodiment thereof.

In the drawings accompanying this description:

FIGURE 1 is a perspective view of my improved oven unit, before it is mounted in the wall or in the cooking range, showing the oven doors in closed position.

FIGURE 2 is a similar view with the outer casing or shell removed, and showing the oven doors in open position.

FIGURE 3 is a fragmentary side elevational view of the oven unit on a larger scale, showing the operation of the door controlling linkage in the movement of the doors from closed to open positions.

FIGURE 4 is a fragmentary detail view showing the coaction of the spring urged detent roller in holding the doors in the third or partly open position.

FIGURE 5 is a transverse sectional view taken through the guide track, traveling roller and through the upper and lower door operating links which are pivoted to this roller.

Referring first to FIGURES 1 and 2, the built-in oven shell comprises sheet metal top and bottom walls 11 and 12, opposite side walls, 13, 13 and a rear end wall 14. The front end of the oven has a vertical opening 15 which is adapted to be closed by upper and lower doors 16 and 17 which are pivoted at their upper and lower corners on stationary hinge pins or pivots 18 and 19 respectively. As shown in FIGURE 3, each door is preferably constructed of spaced front and rear panels 16a, 16b and 17a, 17b respectively, having horizontally bent overlapping flanges 16c and 17c at their upper and lower edges, the space between the front and rear panels being preferably filled with insulating material. A knob or hand pull 21 projects forwardly from the upper edge of the lower door 17 to facilitate opening the doors. If desired, the upper door may be provided with a glass sight window 22 to enable the housewife to observe the cooking progress without opening the doors.

Referring now to the door operating linkage, the upper door is controlled by a pair of right and left hand operating links 24, 24 which enter slot-like depressions in the opposite side edges of this upper door 16. These links 24 have pivotal mounting at their front ends on pivot pins 25 secured to the upper door in each of the slot-like depressions. The lower door 17 is similarly controlled by a pair of right and left links 27, 27 which also enter slot-like depressions in the opposite side edges of the lower door 17. The front ends of these links 27 have pivotal mounting on pivot pins 28 secured to the lower door within each of the slot-like depressions.

These companion pairs of upper and lower links 24 and 27 converge rearwardly together on the outer sides of the oven side walls 13, 13, and have their rear ends pivotally coupled together on transverse rear pivot pins 31. Mounted on each of these transverse pivot pins is a traveling coupling roller 33 which has forward and rearward travel in a substantially horizontal guide track 34 which is secured to the adjacent side wall 13 of the oven.

As shown in FIGURE 5, the guide track 34 is of trough shaped cross section comprising a vertical outer web or wall portion 38, upper and lower track flanges 41 and 42 extending horizontally inwardly from the upper and lower edges of the outer web 38, and upper and lower facing flanges 43 and 44 extending vertically upwardly and downwardly from the inner edges of the track flanges 41 and 42. Punched out in the outer web or wall portion 38 is a horizontally extending slot 39 which permits the transverse rear pivot pin 31 to establish pivotal connection between the rear ends of the door operating links 24, 27 and the traveling roller 33. The traveling roller 33 has an outwardly projecting hub portion 33a which travels in the plane of the slot 39. The pivot pin 31 has a headed mounting portion 31a which is mounted in a recess within the roller 33, and has a reduced shank portion 31b which projects outwardly from the side of the guide track for mounting the apertured rear ends of the two door controlling links 24 and 27.

At the front end of the slot 39 in guide track 34 is formed an inwardly bent lug 46 to which is secured a cushioning stop 47 which defines the forward limit of travel of the traveling roller 33.

Formed in the rear portion of this guide track and guide slot are an upwardly extending hump A and a downwardly extending depression or valley B. At the hump A, the upper and lower track walls 41 and 42 are humped upwardly on rounded arcs 41A and 42A, both struck from the same center. At the depression B the lower track wall 42 is curved downwardly in a rounded arc 42B. The upper track wall 41 is notched or cut away at depression B, thereby forming a pocket C in the top of the guide track into which is adapted to swing a detent roller 49. This detent roller 49 is pivotally mounted at 51 on the forward end of a rocking lever 52 which is pivotally mounted intermediate its ends on a transverse pivot pin 53 which is anchored in the guide track 34. Connected to the rear end of lever 52 is the front end of a tension spring 55 which has its rear end suitably anchored at 56 to the side wall of the oven, the action of this spring being to normally force the detent roller 49 downwardly into the pocket C. The lower limit of movement of the detent roller 49 is defined by the end of the lever 52 striking the bottom of an arcuate notch 58 which is formed in the outer wall 38 of the guide track at the pocket C. The upper door operating link 24 is formed with a downwardly bent dip 24c adjacent to its rear end so as to clear the downwardly projecting front end of lever 52.

The entire guide track 34 is arranged for vertically swiveling adjustment around a front pivot pin 61 which projects outwardly from the oven wall and extends through an apertured front tab or lug 62 at the front end of the track. Projecting from the rear end of the guide track is a similar tab or lugs 64 provided with a vertical slot 65 therein for receiving a locking bolt 66 secured to the side wall of the oven. By virtue of this vertical slot 66, the rear end of the guide track 34 can be adjusted upwardly or downwardly in the installation of the oven doors, thereby operating through the door controlling links 24 and 27 to obtain true alignment of the meeting edges of the two doors when the doors are in closed position.

To aid in holding the doors in their fully open positions, a torsion spring 68 is operatively connected between the door operating links 24 and 27. The intermediate coiled portion 69 of this spring is so biased that the outwardly extending ends 71 of the spring transmit a constant separating force between the two links for yieldingly retaining the oven doors in open position after they have been moved to that position. It should be noted that this torsion spring 68 has floating mounting between its two links 24 and 27, without any portion of the spring having anchorage to any stationary point of attachment. Hence, the separating force of the spring on the links 24 and 27 is not influenced by any of the above up or down adjustments which may be given to the guide track 34.

It will be seen from FIGURE 3 that the lower door 17 moves through approximately 90° from its closed position to its outwardly extending open position, in which open position this lower door functions as a convenient shelf on which the housewife can temporarily place pots and pans in the operation of inserting them into the oven or removing them. The upper door 16, on the other hand, is shown as moving through approximately 120° from its closed position into its open position, in which open position this upper door extends upwardly at a relatively sharp angle, thereby avoiding the necessity of the housewife having to stoop downwardly to get a view into the back of the oven. This differential degree of upper and lower door movement is obtained by locating the upper and lower control link pivots 25 and 28 at different radius arms from the upper and lower door hinge pivots 18 and 19; also by preferably disposing the center line of travel of the link coupling roller 33 above the plane of the meeting edges of the doors. That is to say, the upper radius arm $x$ defined between the upper hinge pivot 18 and the upper link pivot 25 is shorter than the radius arm $y$ defined between the lower hinge pivot 19 and the lower link pivot 28. The location of the center line of guide track 34 above the horizontal plane of the meeting edges of the doors is indicated at $z$, which structural feature is preferred but not essential. In this structural relationship, the upper and lower links 24 and 27 are both preferably of the same length.

It is further contemplated that, by means such as a compound hinge, the upper door 16 may swing through an arc of 180° while the lower door 17 is swinging through an arc of only 90°

When the doors are in their closed positions, as indicated in full lines, the traveling roller 33 which couples the inner ends of the links 24 and 27 together occupies a position near the rear end of the guide track 34. In this position, the spring pressed detent roller 49 swings downwardly to bear against the front periphery of the link coupling roller 33 for yieldingly holding the doors in closed position. When the doors are in their open positions, as indicated in dotted lines in FIGURE 3, the link coupling roller 33 stands in abutment against the cushioning stop 47 at the front end of the guide track 34, with the doors being yieldingly held in open position by the torsion spring 68.

As previously described, my improved door controlling linkage also provides for a third position of the doors in which they stand slightly open to allow free circulation of air in the oven during broiling operations. In this slightly ajar position, the link coupling roller 33 occupies a position in the downwardly extending depression B of the guide track 34, with the detent roller 49 bearing downwardly on the upper peripheral portion of the coupling roller 33 for yieldingly holding the latter in such position, as shown in FIGURE 4.

Referring now to the improved automatic rack sliding mechanism which may be embodied in the oven, it will be seen from FIGURE 2 that this mechanism operatively connects a slidable oven rack, designated 101, with either the lower door 17 or with the upper door 16, through a system of motion transmitting links and connecting lever. The oven rack 101 is mounted for forward and rearward sliding movement on rack supports (not shown), and in the preferred embodiment this rack is operatively connected with the lower door 17. To this end, the lower door has a lug 102 projecting from its inner wall, in which the front end of a link 103 is pivoted on a horizontal pivot axis 104. The rear end of this link has pivotal connection on a vertical pivot axis 105 with the inner portion of a level 106 which is mounted in the rear portion of the oven for horizontal swinging movement around a pivot pin 107 extending upwardly from the bottom wall 12 of the oven. Pivotally mounted at the outer end of the level 106 on the vertical pivot axis 108 is a link 109 which has a looped forward end 110 that embraces the front cross rod of the oven rack 101. It will thus be seen that when the oven doors 16 and 17 are opened, the oven rack 101 is automatically projected outwardly from the oven to accommodate the more convenient placing or removal of pans or food thereon, and when the oven doors are closed this oven rack 101 is automatically retracted back into the oven.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a cooking oven, the combination of upper and lower oven doors hinged substantially at the upper and lower edges of the oven opening on horizontal pivot axes for vertical swinging movement into open and closed positions and also into an intermediate partly open position, pairs of upper and lower door controlling links pivotally connected with said upper and lower doors and extending rearwardly along opposite sides of said oven, coupling rollers coupling the rear ends of each pair of upper and lower links together, guide tracks on the side walls of the oven in which said coupling rollers travel, each of said coupling rollers having a forward limit of travel in its respective guide track corresponding to the open position of said doors and having a rearward limit of travel in its respective guide track corresponding to the closed position of said doors, each of said guide tracks having a depression therein intermediate said forward and rearward limits of travel of its respective coupling roller, each of said coupling rollers being adapted to engage in the depression in its respective guide track when said doors are in their intermediate partly open position, and spring-urged detents cooperating with said coupling rollers, said detents being mounted for engaging against the front sides of said coupling rollers when the latter are at their rearward limits of travel and for engaging against the top sides of said coupling rollers when the latter are engaging in said track depressions.

2. The combination of claim 1 wherein each of the spring-urged detents comprises a detent roller rotatably mounted on a pivoted arm to which a spring is connected for normally urging said detent roller into position for engaging its respective coupling roller.

3. In a cooking oven, the combination of upper and lower oven doors, upper and lower hinge pivots hingedly mounting said upper and lower doors adjacent to the upper and lower edges of the oven opening for vertical swinging movement between open and closed positions and also into an intermediate partly open position, upper and lower control pivots on said upper and lower doors spaced from said hinge pivots, upper and lower control links having their front ends pivotally mounted on said upper and lower control pivots, a traveling coupling roller to which the rear ends of said upper and lower control links are pivotally coupled, a substantially horizontal guide track comprising upper and lower track flanges between which said coupling roller is adapted to travel, the upper radius arm defined between the upper control pivot and the upper hinge pivot being shorter than the lower radius arm defined between the lower control pivot and the lower hinge pivot, whereby when the lower door is swunk downwardly from closed position through substantially 90° into an outwardly extending shelf-like open position said upper door is swung upwardly through more than 90° into an upwardly inclined open position, a hand-pull on the outer side of said lower door through which an outward and downward pull is exerted for opening both of said doors, said lower track flange having a depression therein into which said coupling roller is adapted to drop when said doors are in their intermediate partly open position, said upper track flange having a notch therein above said depression, and a spring pressed detent roller adapted to move down through said notch to engage said coupling roller when the latter is in its rearward position for yieldingly holding said doors in closed position, and also to engage said coupling roller when the latter is in said depression for yieldingly holding said doors in their intermediate partly open position, said spring detent roller yieldingly releasing said coupling roller in response to outward pull transmitted by way of said hand-pull and lower door through said lower control link to said coupling roller for permitting the opening of said doors.

4. In a cooking oven, the combination of upper and lower oven doors hinged substantially at the upper and lower edges of the oven opening on horizontal pivot axes for vertical swinging movement into open and closed positions and also into an intermediate partly open position, pairs of upper and lower door controlling links pivotally connected with said upper and lower doors and extending rearwardly along opposite sides of said oven, coupling rollers coupling the rear ends of each pair or upper and lower links together, guide tracks on the side walls of the oven in which said coupling rollers travel, each of said coupling rollers having a forward limit of travel in its respective guide track corresponding to the open position of said doors and having a rearward limit of travel in its respective guide track corresponding to the closed position of said doors, each of said guide tracks comprising upper and lower substantially parallel track flanges between which said coupling rollers travel, each of said lower track flanges having a downward depression therein intermediate the front and rear ends of its respective track, each of said coupling rollers being adapted to engage in said depression in the lower track flange of its respective guide track when said doors are in their intermediate partly open position, each of said upper track flanges having a notch opening downwardly therethrough substantially directly above said depression in the lower track flange, a rocking level pivotally mounted on each of said guide tracks, a detent roller rotatably mounted on one end of each of said rocking levers and adapted to have swinging movement down into said notch in the upper track flange of its respective guide track, and a tension spring connected to the other end of each of said levers for yieldingly forcing each of said detent rollers down into its associated notch, whereby said detent rollers are operative to engage against the front sides of said coupling rollers when the latter are at their rearward limits of travel and are operative to yieldingly engage against the top sides of said coupling rollers when the latter are engaging in said track depressions.

5. In a cooking oven embodying the construction set forth in claim 4 wherein the upper radius arm which is defined between the upper horizontal pivot axis of the upper door and the upper pivotal connection of the upper link with said upper door is shorter than the lower radius arm which is defined between the lower horizontal pivot axis of the lower door and the lower pivotal connection of the lower link with said lower door, whereby when the lower door is swung downwardly from closed position through substantially 90° into an outwardly extending shelf-like open position said upper door is swung upwardly through more than 90° into an upwardly inclined open position.

6. In a cooking oven, the combination of upper and lower oven doors hinged substantially at the upper and lower edges of the oven opening on horizontal pivot axes for vertical swinging movement into open and closed positions and also into an intermediate partly open position, pairs of upper and lower door controlling links pivotally connected with said upper and lower doors and extending rearwardly along opposite sides of said oven, pivot pins coupling the rear ends of each pair of upper and lower links together, coupling rollers mounted on said pivot pins, guide tracks on the side walls of the oven in which said coupling rollers travel, each of said coupling rollers having a forward limit of travel in its respective guide track corresponding to the open position of said doors and having a rearward limit of travel in its respective guide track corresponding to the closed position of said doors, each of said guide tracks being of trough-shaped cross section comprising a vertical outer web portion, upper and lower track flanges extending horizontally inwardly from the upper and lower edges of said web portions, and upper and lower fastening flanges extending vertically upwardly and downwardly from the inner edges of said track flanges for fastening to the side wall of the oven, the outer web portion of each guide track having a horizontally extending slot therein extending lengthwise of the track, said associated coupling roller rolling between said upper and lower track flanges on the inner side of said web portion with said pivot pin extending from the coupling roller outwardly through said slot for connection with said pair of upper and lower links, a depression formed in each of said lower track flanges intermediate the front and rear ends of the respective track, each of said coupling rollers being adapted to engage in said depression when said doors are in their intermediate partly open position, a notch cut out in each of the upper track flanges substantially directly above said depression, a rocking lever pivotally mounted on each guide track, a detent roller rotatably mounted on one end of each of said rocking levers and adapted to have swinging movement down into said notch in the upper track flange, and a tension spring connected to the other end of each of said levers for yieldably forcing each detent roller down into its associated notch and into the path of travel of the associated coupling roller, whereby said detent rollers are operative to yieldingly engage against the front sides of said coupling rollers when the latter are at their rearward limits of travel and are operative to yieldingly engage against the top sides of said coupling rollers when the latter are engaging in said track depressions.

7. In a cooking oven embodying the construction set forth in claim 6, and further characterized by pivot means pivotally mounting one end of each guide track on the oven wall so as to enable each guide track to be tiltably adjusted to different angular positions relatively to the horizontal, and clamping means at the other end of each guide track for clamping the guide track to the oven wall in its different positions of adjustment.

8. In a cooking oven embodying the construction set forth in claim 6, wherein each guide track is formed with an upwardly extending hump located forwardly of or in advance of said depression in said lower track flange, said hump being defined in each guide track by both said upper and lower track flanges being humped upwardly on rounded arcs formed substantially concentrically.

9. A door structure comprising: a pair of doors movable between open and closed positions through an intermediate position; a pair of door controlling links pivotally connected with said pair of doors and extending away from said doors; a coupling roller coupling the pair of links together in an area spaced from said doors; a guide track in which said coupling roller travels, said coupling roller having a forward limit of travel in its guide track corresponding to the open position of said doors and having a rearward limit of travel in its guide track corresponding to the closed position of said doors, said guide track having a depression therein intermediate said forward and rearward limits of travel of its coupling roller, said coupling roller being adapted to engage in said depression when said doors are in their intermediate position; a detent engaging said roller at a side thereof adjacent the doors when said roller is at said rearward limit of travel and engaging said roller at a side thereof opposite said depression at said intermediate position of the doors; and means urging said detent into said engagement with said roller.

References Cited in the file of this patent

UNITED STATES PATENTS

| | | |
|---|---|---|
| 422,310 | Marquart | Feb. 25, 1890 |
| 554,033 | Ruth | Feb. 4, 1896 |
| 862,602 | Baxter | Aug. 6, 1907 |
| 949,984 | Knauss | Feb. 22, 1910 |
| 1,072,809 | Baxter | Sept. 9, 1913 |
| 1,653,280 | Herwig et al. | Dec. 20, 1927 |
| 1,896,307 | Hatch | Feb. 7, 1933 |
| 1,969,749 | Harsh | Aug. 14, 1934 |
| 1,989,275 | Hatch | Jan. 29, 1935 |
| 2,029,718 | Hobson et al. | Feb. 4, 1936 |
| 2,319,651 | Wilkinson et al. | May 18, 1943 |
| 2,473,467 | Burt | June 14, 1949 |
| 2,638,894 | Corn | May 19, 1953 |
| 2,708,709 | Pearce | May 17, 1955 |
| 2,808,257 | Brookbank | Oct. 1, 1957 |
| 2,815,018 | Collins | Dec. 3, 1957 |
| 2,823,664 | Evans et al. | Feb. 18, 1958 |
| 2,869,954 | Kesling | Jan. 20, 1959 |